United States Patent [19]

Diehl et al.

[11] Patent Number: 4,940,654

[45] Date of Patent: Jul. 10, 1990

[54] SOLID PARTICLE DISPERSION FILTER DYES FOR PHOTOGRAPHIC COMPOSITIONS

[75] Inventors: Donald R. Diehl; Ronda E. Factor, both of Rochester, N.Y.

[73] Assignee: Eastman Kodak Company, Rochester, N.Y.

[21] Appl. No.: 373,749

[22] Filed: Jun. 30, 1989

Related U.S. Application Data

[63] Continuation-in-part of Ser. No. 137,495, Dec. 23, 1987, abandoned.

[51] Int. Cl.$^5$ ................................................. G03C 1/84
[52] U.S. Cl. ..................................... 430/522; 430/510; 430/517
[58] Field of Search ................ 430/510, 522, 517, 513

[56] References Cited

U.S. PATENT DOCUMENTS

| | | | |
|---|---|---|---|
| 2,527,583 | 2/1946 | Selberstein et al. | 95/ |
| 2,538,009 | 1/1951 | Keyes et al. | 95/ |
| 3,282,699 | 1/1962 | Jones et al. | 96/ |
| 3,406,069 | 10/1968 | Duerman | 430/519 |
| 3,746,539 | 7/1973 | Ohmatsu et al. | 430/522 |
| 3,795,519 | 3/1974 | Miyazaka et al. | 96/ |
| 3,932,188 | 1/1976 | Tanaka et al. | 430/522 |
| 4,092,168 | 5/1978 | Limahieu et al. | 96/ |
| 4,110,115 | 8/1978 | Sugiyama et al. | 96/ |
| 4,203,716 | 5/1980 | Chen | 430/570 |
| 4,294,916 | 10/1981 | Postle et al. | 430/522 |
| 4,294,917 | 10/1981 | Postle et al. | 430/522 |
| 4,309,500 | 1/1982 | Shishida | 430/ |
| 4,420,555 | 12/1983 | Kreuger et al. | 430/ |
| 4,440,852 | 4/1984 | Onishi et al. | 430/522 |
| 4,500,631 | 2/1985 | Sakamoto et al. | 430/522 |
| 4,542,091 | 9/1985 | Sasaki et al. | 430/ |
| 4,716,099 | 12/1987 | Simons | 430/510 |
| 4,756,993 | 7/1988 | Kitatani et al. | 430/522 |
| 4,764,455 | 8/1988 | Arakawa et al. | 430/512 |

FOREIGN PATENT DOCUMENTS

| | | |
|---|---|---|
| 141298 | 5/1984 | European Pat. Off. |
| 113434 | 6/1984 | Japan |
| 500795 | 3/1939 | United Kingdom |
| 1414456 | 4/1972 | United Kingdom |

OTHER PUBLICATIONS

Research Disclosure 14416, Light-Absorbing Dyes for Photographic Elements, Apr. 1976, pp. 17-20.

*Primary Examiner*—Jack P. Brammer
*Attorney, Agent, or Firm*—Paul L. Marshall

[57] ABSTRACT

Solid particle dispersions of dyes of the formula:

$$[D-(A)_y]-X_n$$

where

D that comprises an aromatic ring if y is 0, A is an aromatic ring bonded directly or indirectly to D, X is a substituent, other than carboxy, having an ionizable proton, either on A or on an aromatic ring portion of D, having a pKa of about 4 to 11 in a 50/50 mixture (volume basis) of ethanol and water, y is 0 to 4, n is 1 to 7, and the compound has a log partition coefficient of from about 0 to 6 when the compound is in unionized form, are disclosed for filter dye layers of photographic elements. They may be coated in layers of photographic elements without a mordant, and they do not wander at coating pH's. At processing pH's, however, they are solubilized for easy removal and/or decolorization.

10 Claims, No Drawings

SOLID PARTICLE DISPERSION FILTER DYES FOR PHOTOGRAPHIC COMPOSITIONS

This application is a continuation-in-part of application Ser. No. 137,495, filed Dec. 23, 1987 now abandoned.

FIELD OF THE INVENTION

This invention relates to dyes, particularly dyes useful as filter dyes, especially in photographic compositions and elements.

BACKGROUND OF THE INVENTION

Photographic materials often contain filter dyes to absorb light from different regions of the spectrum, such as red, blue, green, ultraviolet, and infrared, to name a few. These filter dyes are often required to perform the function of absorbing light during exposure of the material so as to prevent or at least inhibit light of a region of the spectrum from reaching at least one of the radiation-sensitive layers of the element.

After processing of the element, however, the continued presence of the filter dye will adversely affect the image quality of the photographic material. It is therefore desirable to use filter dyes that will be solubilized and removed or at least decolorized during photographic processing. Dyes that are easily solubilized, however, tend to wander throughout the photographic material during coating, adversely affecting the final image quality.

To prevent dye wandering, the dyes are often coated with a mordant to bind the dye in the layer in which it is coated. Dye mordants, while often useful, tend to either bind the dye too strongly, inhibiting removal of the dye during photographic processing, or too weakly, thus not preventing dye wandering.

Lemahieu et al describe in U.S. Pat. No. 4,092,168 a combination of specific monomethine oxonol and pentamethine carboxy-substituted oxonol dyes useful as antihalation dyes. The dyes are insoluble at coating pH's, thus eliminating the need for a dye mordant, and are soluble for removal and/or decolorization at processing pH's. These dyes are disclosed as being dispersible as solid particles in aqueous hydrophilic colloid compositions; however, no suggestion is given that any other dyes might possess the same beneficial solubility properties. The reference discusses the absorbance properties of the dyes and their suitability for antihalation use, but no teaching whatsoever is presented as to what other dyes might possess the beneficial solubility properties of being aqueous-insoluble at coating pH's and highly aqueous-soluble at processing pH's. There is also no teaching that would enable anyone as to how to choose dyes other than those specifically disclosed in the U.S. Pat. No. 4,092,168 to obtain those properties.

Postle et al U.S. Pat. Nos. 4,294,916 and 4,294,917 describe solid dispersions of photographic filter dyes, including a carboxyphenyl-substituted dye as preparation 6 of the '917 patent. The dyes are said to offer the advantage of broad spectral absorption. Many of the dye dispersions described in these references, however, are subject to dye wandering in the hydrophilic layers of photographic elements. No teaching is made as to what dyes might possess the beneficial solubility properties of being aqueous-insoluble at coating pH's so as to be substantially free from dye wandering in a photographic element, yet highly aqueous-soluble at processing pH's for decolorization.

Kreuger et al describe in U.S. Pat. No. 4,420,555 specific yellow filter dyes for incorporation into film-forming polymeric binders in photographic elements. The dyes are preferably incorporated in the binders in loaded polymeric latexes. These dyes are disclosed as being removable and/or decolorizable during photographic processing. The dyes are not disclosed as being coatable as solid particle dispersions and, as with U.S. Pat. No. 4,092,168, there is no teaching or suggestion that any dyes other than those specifically disclosed (or, for that matter, even the dyes disclosed therein) might possess the beneficial concomitant advantages of being aqueous-insoluble at coating pH's and aqueous-soluble at processing pH's.

Prior to the present invention, there has been a lack of recognition in the prior art that there might exist a broad class of dyes having a specific set of properties that allow them to be prepared and incorporated into photographic compositions and elements as solid particle dispersions that are aqueous-insoluble at coating pH's and aqueous-soluble at photographic processing pH's. It would, of course, be highly desirable to provide a broad class of filter dyes for use in photographic elements that do not wander during coating, are fully solubilized during processing, and do not require a mordant.

It has now been discovered that a broad class of dyes, where the dye and its substituents are chosen so as to meet a specific combination of solubility criteria for both acid/base and nonpolar/polar systems, can be prepared as solid particle dispersions having the above-described beneficial solubility properties.

SUMMARY OF THE INVENTION

These solid particle dispersions are of compounds according to the formula:

$$[D-(A)_y]-X_n, \qquad (I)$$

D is a chromophoric light-absorbing moiety, which comprises an aromatic ring if y is 0, A is an aromatic ring bonded directly or indirectly to D, X is a substituent, other than carboxy, having an ionizable proton, either on A or on an aromatic ring portion of D, having a pKa of 4 to 11 in a 50/50 mixture (volume basis) of ethanol and water, y is 0 to 4, n is 1 to 7, and the compound has a log partition coefficient of from 0 to 6 when the compound is in unionized form.

Such dye dispersions are substantially aqueous insoluble at a pH of 6 or below and substantially non-wandering in a photographic element, and substantially aqueous soluble at a pH of 8 or above.

Although U.S. Pat. Nos. 4,092,168 and 4,294,917 disclose specific carboxy-substituted dye dispersions having the above-described beneficial solubility properties, they and the rest of the prior art does not provide any disclosure that would enable one skilled in the art to determine other dyes that would have the same beneficial properties. The present invention provides that enabling disclosure.

The dye dispersions of the invention are coatable in hydrophilic vehicle (e.g., gelatin) layers of photographic elements, and do not require a mordant to prevent them from wandering at the normal coating pH's of 6 or below (usually 4 to 6). At the normal photographic processing pH's of 8 and above (usually 8 to 12), however, the dye dispersions are highly soluble, allowing them to be easily removed and/or decolorized.

DETAILED DESCRIPTION OF THE INVENTION

The chromophoric light-absorbing compound, D, of formula (I) can be any of a number of well-known dye compounds. These include cyanines, merocyanines, oxonols, arylidenes (i.e., merostyryls), anthraquinones, triphenylmethanes, azo dye types, azomethines, and others. The specific dye used is not critical, as long as all the criteria of formula (I) are met. These dyes are commonly used in the photographic art, and are more fully described in James, *The Theory of the Photographic Process*, 4th, Macmillan, New York (1977) and Hamer, *The Cyanine Dyes and Related Compounds*, Interscience (1964).

The cyanine dyes include, joined by a methine linkage, two basic heterocyclic nuclei, such as those derived from quinolinium, pyridinium, isoquinolinium, 3H-indolium, benz[e]indolium, oxazolium, thiazolium, selenazolinium, imidazolium, benzoxazolinium, benzothiazolium, benzoselenazolium, benzimidazolium, naphthoxazolium, naphthothiazolium, naphthoselenazolium, thiazolinium dihydronaphthothiazolium, pyrylium, and imidazopyrazinium quaternary salts.

The merocyanine dyes include, joined by a methine linkage, a basic heterocyclic nucleus of the cyanine dye type and an acidic nucleus, such as can be derived from barbituric acid, 2-thiobarbituric acid, rhodanine, hydantoin, 2-thiohydantoin, 4-thiohydantoin, 2-pyrazolin-5-one, 2-isoxazolin-5-one, indan-1,3-dione, cyclohexan-1,3-dione, 1,3-dioxan-4,6-dione, pyrazolin-3,5-dione, pentan-2,4-dione, alkylsulfonyl acetonitrile, malononitrile, isoquinolin-4-one, and chroman-2,4-dione.

The oxonol dyes include, joined by a methine or bridged methine linkage, two acidic carbo- or heterocyclic nuclei, such as those described above for merocyanine dyes, with the exclusion of 2-pyrazolin-5-one.

The arylidene dyes include, joined by a methine or bridged methine linkage, an acidic nucleus as described previously and an aryl group, substituted with electron-donating substituents, such as alkyl- or dialkylamino, methoxy, and the like.

The anthraquinone dyes include those compounds derived from the anthraquinone nucleus and substituted with electron donating or electron withdrawing groups so as to extend the chromophoric nature of the compound.

The triphenylmethane dyes include those compounds with three aryl groups joined to a single methine linkage and substituted with suitable electron-donating or electron-withdrawing substituents so as to produce an extended chromophoric system.

The azo dyes include any of a large class of compounds with two nitrogens in the linkage between multiply-substituted aryl groups, as is known in the art.

The azomethine dyes include, joined by a single nitrogen in the unsaturated linkage, an acidic nucleus as described previously for the merocyanine dyes, and an aryl group substituted with electron-donating substituents such as alkyl- or dialkylamino, methoxy, and the like.

All the above-described chromophoric light-absorbing compounds are well-known in the art. Additional examples of these and other dye classes suitable for use in this invention are disclosed in the *Colour Index 3d*, The Society of Dyers and Colourists, Great Britain (1971), the disclosure of which is incorporated herein by reference.

The aromatic ring (A or an aromatic ring, to which X is attached, that is part of D) of formula (I) can be any aromatic ring capable of bonding with D and X in a manner such that the proper pKa and log P are achieved. Examples of such rings include phenyl, naphthyl, anthracenyl, pyridyl, acenaphthyl, dihydronaphthyl, and pyrimidyl. The aromatic ring A, if present, may be bonded directly to D or indirectly (i.e., through a divalent linking group, such as alkyl, as is known in the art) to D.

The substituent, X, of formula (I) having an ionizable proton with a pKa in a 50/50 mixture (volume basis) of ethanol and water of from 4 to 11, when attached to the aromatic ring of formula (I), can be easily chosen by one skilled in the art. Examples of A-X include sulfonamidophenyl (e.g., Ph-NHSO$_2$R where Ph is a phenyl ring),

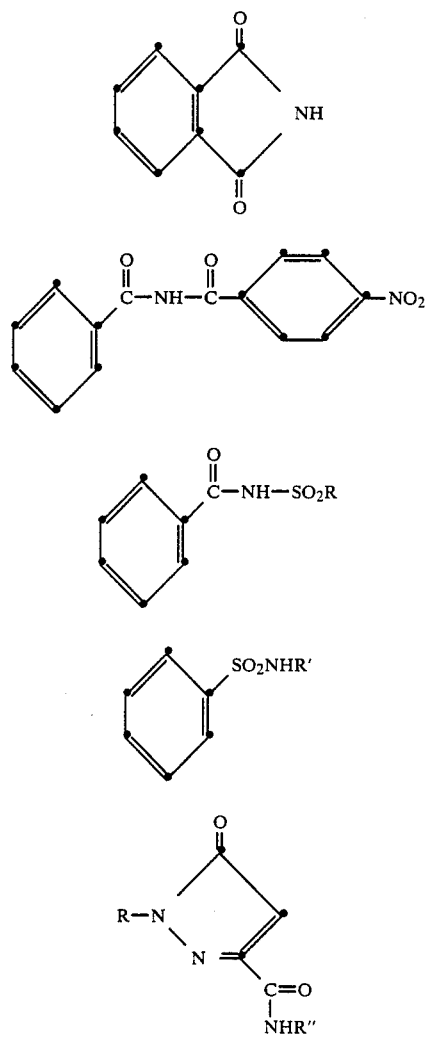

where R is alkyl (e.g., of about 1 to 6 carbon atoms) or aryl (e.g., phenyl), R' is acyl (e.g., —CO—R), phenyl, or vinyl, and R" is —CO—Ph or SO$_2$R. In a preferred embodiment, X has a pKa of from 7 to 11. Examples of A–X where X has a pKa of 7 to 11 include sulfonamidophenyl (e.g., Ph-NHSO₂R where Ph is a phenyl ring),

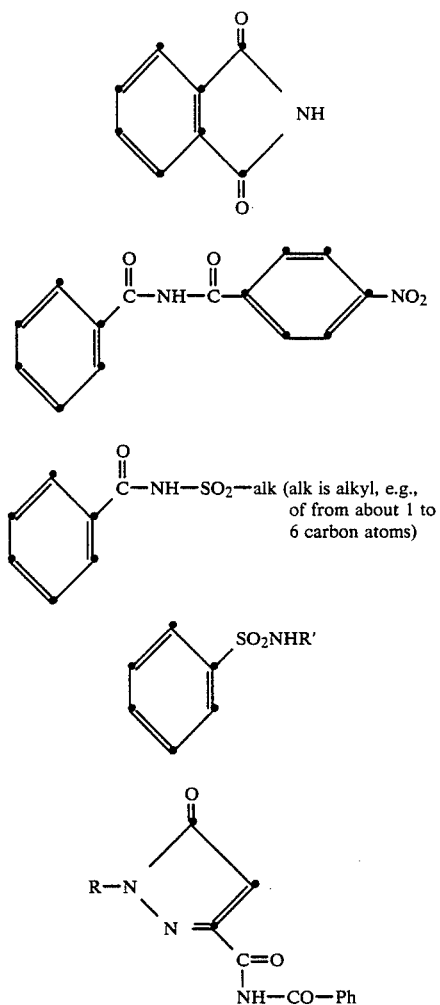

Sulfonamido is an especially preferred X substituent (especially NHSO₂R where R is a substituted or unsubstituted alkyl group of from 1 to 6 carbon atoms).

The pKa parameter is a well-known measurement of the dissociation constant of an ionizable compound in aqueous environments (in effect, it is a measure of the "ionizability" of the X substituent in the above formula) (the present invention does not require the dyes of formula (I) to be processed in ethanol and water to function; rather, the ethanol and water is simply a reference solution for determining the pKa). It is discussed in most basic chemistry texts and does not require further explanation here. Techniques for determining the pKa of a compound in ethanol in water are well-known in the art and many reference texts present such pKa data in tabular form. The log partition coefficient (log P) of the unionized (i.e., neutral) compounds of formula (I) is preferably from 0 to 6. The log P parameter is a well-known measurement of the solubility of a compound in aqueous liquids compared to its solubility in nonpolar organic solvents. The log P parameter is further described, along with log P data for organic compounds, in C. Hansch & T. Fujita, J. Am. Chem. Soc., 86, 1616–25 (1964) and A. Leo & C. Hansch, *Substituent Constants for Correlation Analysis in Chemistry and Biology*, Wiley, New York (1979), the disclosure of which is incorporated herein by reference.

Examples of compounds according to formula (I) are presented in the following Tables I–XVI Except where stated otherwise, absorbance data are given for the dye in methanol.

TABLE I

Benzoylacetonitrile Merocyanines
General Structure:

![structure]

| Dye | R¹ | R² | λ-max | ε-max (× 10⁴) (methanol) |
|-----|----|----|-------|--------------------------|
| 1 | n-C₆H₁₃SO₂NH | CH₃ | 445 | 7.32 |
| 2 | CH₃SO₂NH | C₃H₇ | 446 | 7.86 |
| 3 | CH₃SO₂NH | n-C₆H₁₃ | 447 | 7.6 |
| 4 | H | CH₃ | 449 | 6.5 |

TABLE II

General Structure:

![structure]

| Dye | R¹ | R² | R³ |
|-----|----|----|----|
| 5 | H | Et | MeOEtSO₂NH |
| 6 | H | Me | MeSO₂NH |
| 7 | MeOEtSO₂NH | Et | MeOEtSO₂NH |
| 8 | MeOEtSO₂NH | Et | HexSO₂NH |
| 9 | MeSO₂NH | MeOEt | MeSO₂NH |
| 10 | MeSO₂NH | MeOEt | PrSO₂NH |
| 11 | MeOEtSO₂NH | MeOEt | PrSO₂NH |
| 12 | EtSO₂NH | Et | MeSO₂NH |
| 13 | EtSO₂NH | Me | MeSO₂NH |
| 14 | MeOEtSO₂NH | MeOEt | MeOEtSO₂NH |
| 15 | HexSO₂NH | MeOEt | MeSO₂NH |
| 16 | MeOEtSO₂NH | MeOEt | HexSO₂NH |
| 17 | MeSO₂NH | Me | MeSO₂NH |
| 18 | EtOEtOEtSO₂NH | Et | MeSO₂NH |
| 19 | EtOEtOEtSO₂NH | Et | PrSO₂NH |
| 20 | PrSO₂NH | Et | MeSO₂NH |
| 21 | EtOEtOEtSO₂NH | Et | EtSO₂NH |
| 22 | MeSO₂NH | Et | EtSO₂NH |
| 23 | EtSO₂NH | Et | EtSO₂NH |
| 24 | BuSO₂NH | Et | MeSO₂NH |
| 25 | BuSO₂NH | Me | MeSO₂NH |
| 26 | MeSO₂NH | Et | BuSO₂NH |

27

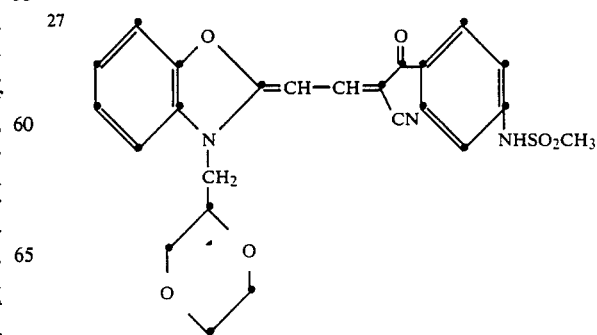

TABLE II-continued
General Structure:

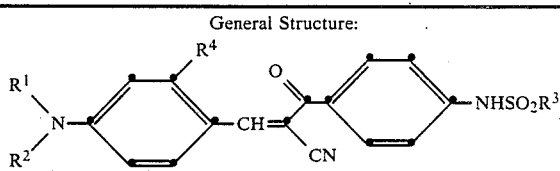

λ-max 450 nm (MeOH)  ε-max = 7.14 × 10⁴

TABLE III
General Structure:

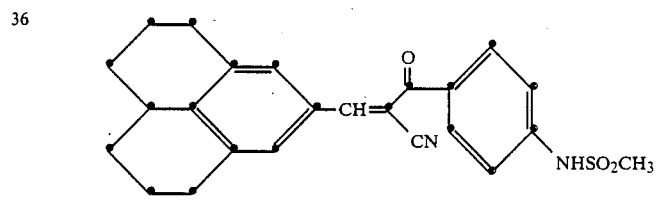

| Dye | R¹ | R² | R³ | R⁴ | λ-max | ε-max (× 10⁴) (methanol) |
|---|---|---|---|---|---|---|
| 28 | i-PrO₂CCH₂ | i-PrO₂CCH₂ | C₃H₇ | CH₃ | 426 | 3.5 |
| 29 | C₂H₅ | CF₃CH₂O₂CCH₂ | CH₃ | CH₃ | 439 | 4.27 |
| 30 | i-PrO₂CCH₂ | i-PrO₂CCH₃ | CH₃ | CH₃ | 420 | 4.2 |
| 31 | C₂H₅ | CF₃CH₂O₂CCH₂ | C₃H₇ | CH₃ | 430 | 4.25 |
| 32 | CH₃ | CH₃ | CH₃ | H | 443 | 4.59 |
| 33 | CH₃ | CH₃ | C₂H₅ | H | 443 | 4.44 |
| 34 | CH₃ | CH₃ | n-Pr | H | 443 | 4.65 |
| 35 | CH₃ | CH₃ | n-Bu | H | 442 | 4.51 |

36

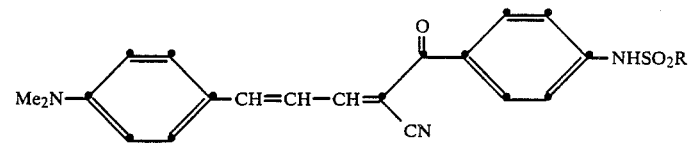

λ-max 474 nm (MeOH)  ε-max = 5.19 × 10⁴

TABLE IV

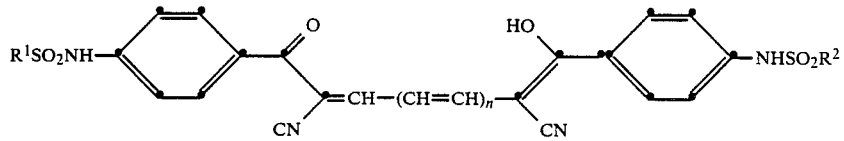

| 37 | R = CH₃ | λ-max 488 nm (MeOH) ε-max = 4.90 × 10⁴ |
|---|---|---|
| 38 | R = n-Pr | λ-max 490 nm ε-max = 4.93 × 10⁴ |

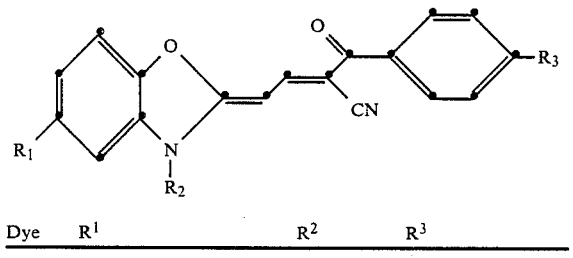

| Dye | R¹ | R² | R³ |
|---|---|---|---|

TABLE V
Benzoylacetonitrile Oxonol Dyes
General Structure:

$$R^1SO_2NH-\phantom{xxx}-CH-(CH=CH)_n-\phantom{xxx}-NHSO_2R^2$$

| Dye | R¹ | R² | n | λ-max | ε-max (× 10⁴) (methanol) |
|---|---|---|---|---|---|
| 39 | CH₃ | CH₃ | 1 | 505 | 8.96 |
| 40 | n-Pr | n-Pr | 1 | 504 | 9.43 |
| 41 | CH₃ | CH₃ | 2 | 603 | 11.9 |
| 42 | n-Pr | n-Pr | 2 | 604 | 10.5 |

TABLE VI

Pyrazolone Arylidene General Structure:

| Dye | R¹ | R² | R³ | R⁴ | R⁵ | λ-max | ε-max |
|---|---|---|---|---|---|---|---|
| 43 | i-PrO₂CCH₂ | i-PrO₂CCH₂ | H | CH₃ | Ph | 424 | 3.98 |
| 44 | i-PrO₂CCH₂ | i-PrO₂CCH₂ | CH₃ | CH₃ | Ph | 423 | 3.86 |
| 45 | Me | Me | H | CH₃ | CH₃ | 463 | 4.22 |

TABLE VII

| | | | |
|---|---|---|---|
| 46 | n = 1 | λ-max 548 nm (MeOH) | ε-max = 14.0 × 10⁴ |
| 47 | n = 0 | λ-max 449 nm (MeOH) | ε-max = 7.3 × 10⁴ |

TABLE VIII

Arylidene Dyes General Structure:

| Dye | R¹, R² | R³ | R⁴ | R⁵ | n |
|---|---|---|---|---|---|
| 48 | C₂H₅ | H | CH₃ | CH₃ | 0 |
| 49 | n-C₄H₉ | H | CH₃ | CH₃ | 0 |
| 50 | CH₃ | H | COOC₂H₅ | CH₃ | 0 |
| 51 | i-C₃H₇OCCH₂ (‖ O) | CH₃ | CH₃ | C₂H₅ | 0 |
| 52 | CH₃ | H | CH₃ | n-Pr | 0 |
| 53 | C₂H₅ | H | CH₃ | C₂H₅ | 0 |
| 54 | n-C₄H₉ | H | CH₃ | C₂H₅ | 0 |
| 55 | i-C₃H₇OCCH₂ (‖ O) | H | CH₃ | CH₃ | 0 |
| 56 | i-C₃H₇OCCH₂ (‖ O) | CH₃ | CH₃ | CH₃ | 0 |
| 57 | i-C₃H₇OCCH₂ (‖ O) | H | CH₃ | n-Pr | 0 |
| 58 | CH₃ | H | O=C−CH₃ | C₂H₅ | 1 |
| 59 | CH₃ | H | COOEt | C₂H₅ | 0 |
| 60 | C₂H₅ | H | COOEt | C₂H₅ | 0 |

TABLE VIII-continued

Arylidene Dyes
General Structure:

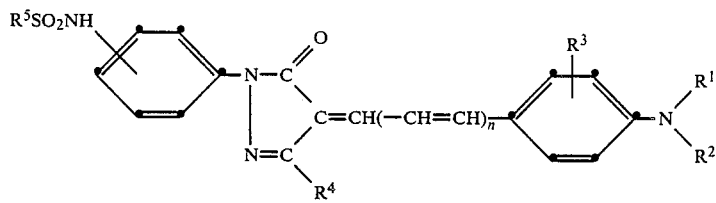

| Dye | $R^1, R^2$ | $R^3$ | $R^4$ | $R^5$ | n |
|---|---|---|---|---|---|
| 61 | $CH_3$ | H | $CF_3$ | $CH_3$ | 0 |
| 62 | $CH_3$ | H | Ph | $CH_3$ | 0 |
| 63 | $CH_3$ | H | $\overset{O}{\underset{\|}{C}}-CH_3$ | $CH_3$ | 0 |
| 64 | $CH_3$ | H | $CH_3$ | $CH_3$ | 1 |
| 65 | $CH_3$ | H | COOEt | $CH_3$ | 1 |

TABLE IX

Pyrazolone Oxonol Dyes
General Structure:

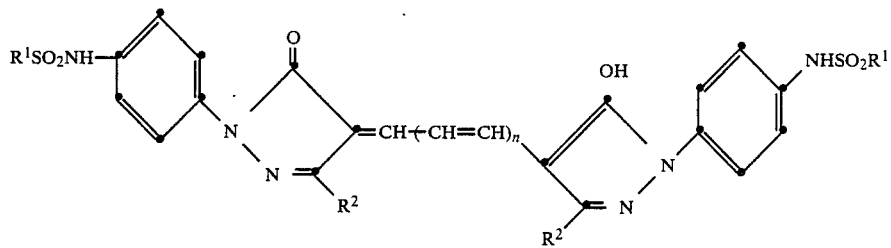

| Dye | $R^1$ | $R^2$ | n | λ-max | ε-max (× $10^4$) |
|---|---|---|---|---|---|
| 66 | Ph | $CH_3$ | 1 | 522 | 8.33 |
| 67 | $CH_3$ | $CH_3$ | 1 | 522 | 8.72 |
| 68 | $CH_3$ | $CH_3$ | 2 | 624 | 13.5 |
| 69 | $CH_3$ | $CH_3$ | 0 | 434 | 2.96 |

TABLE X

Miscellaneous Dyes
General Structure:

Dye 70

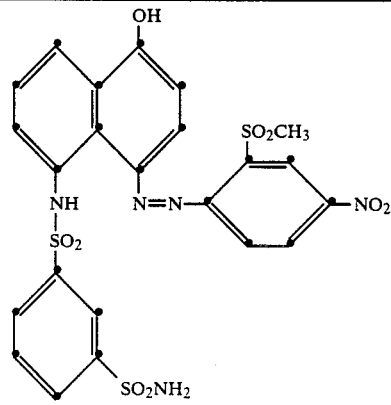

TABLE X-continued

Miscellaneous Dyes
General Structure:

Dye 71

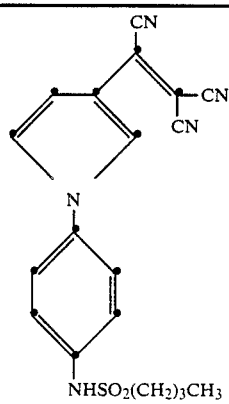

TABLE X-continued
Miscellaneous Dyes
General Structure:
| Dye | |
|---|---|
| 72 | 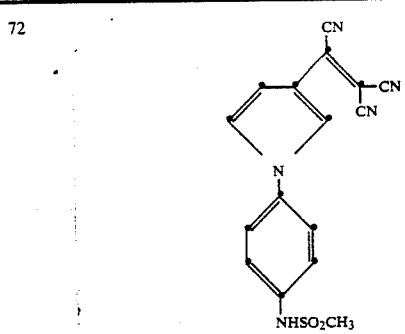 |
| 73 | 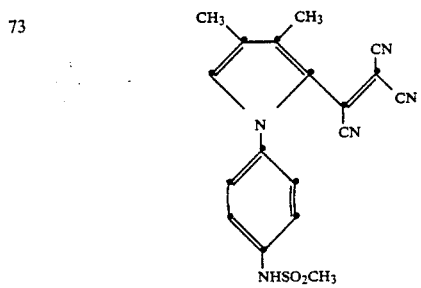 |
TABLE XI
Arylidene Dyes
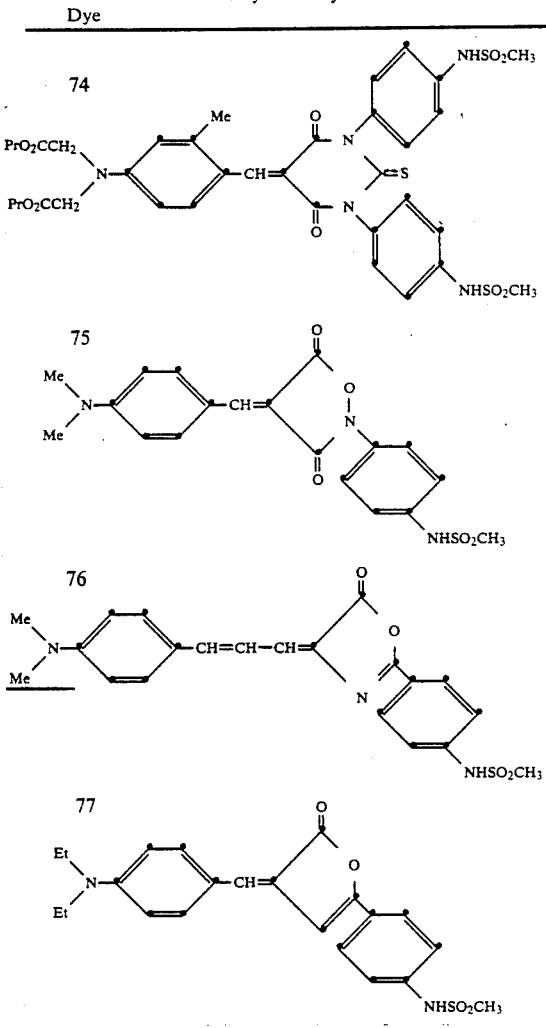

4,940,654
TABLE XI-continued
Arylidene Dyes
78
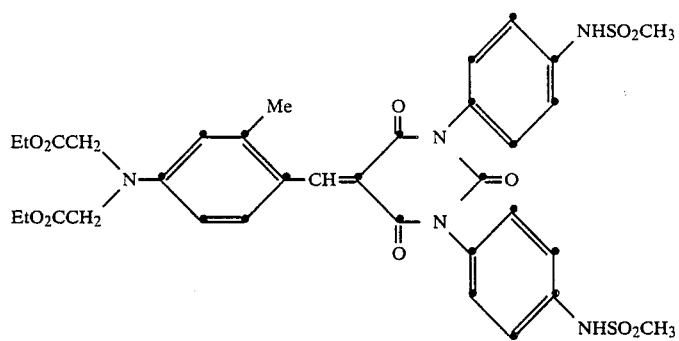
79
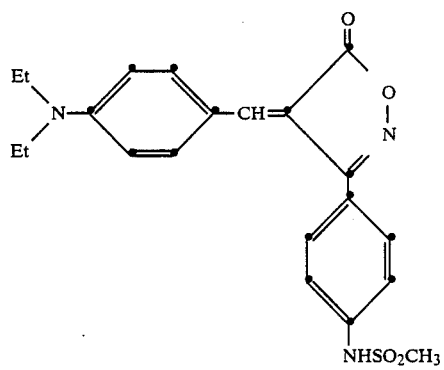
80
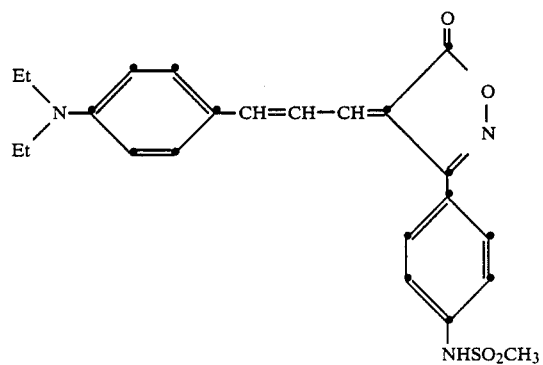
81
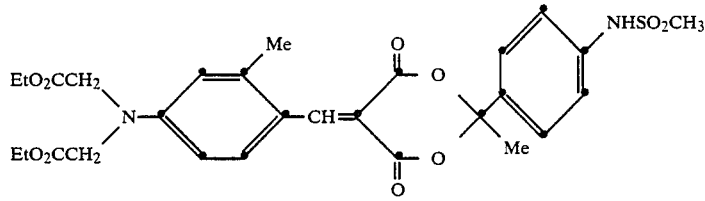
82
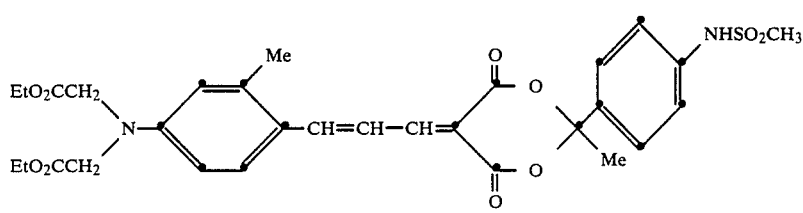

TABLE XII

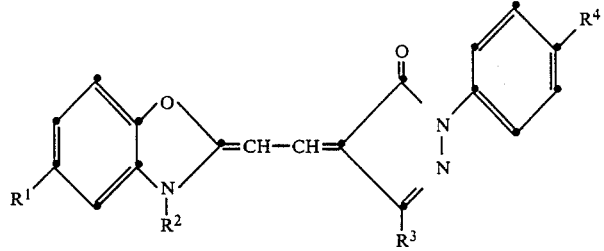

| Dye | R¹ | R² | R³ | R⁴ |
|---|---|---|---|---|
| 83 | MeSO₂NH | Me | Me | CONHSO₂CH₃ |
| 84 | EtSO₂NH | Et | CO₂Et | CONHSO₂Ph |
| 85 | PrSO₂NH | Me | CONHSO₂CH₃ | Ph |
| 86 | H | CH₂PhNHSO₂Me | CH₃ | SO₂NHCOCH₃ |
| 87 | H | CH₂PhCONHSO₂Me | CH₃ | SO₂NHPh |
| 88 | MeSO₂ | Et | CONHSO₂CH₃ | Ph |
| 89 | MeSO₂NHCO | Me | CH₃ | MeSO₂NH |

TABLE XIII

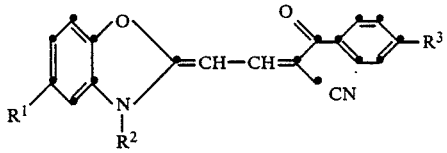

| Dye | R¹ | R² | R³ |
|---|---|---|---|
| 90 | MeSO₂NHCO | Me | CONHSO₂Me |
| 91 | MeSO₂NH | Et | CONHSO₂Ph |
| 92 | H | CH₂PhCONHSO₂Me | NHSO₂Me |
| 93 | H | CH₂PhNHSO₂Me | NHSO₂Me |
| 94 | MeSO₂NHCO | Me | NHSO₂Pr |
| 95 | MeSO₂NH | CH₂PhNHSO₂Ph | NHSO₂Pr |

TABLE XIV

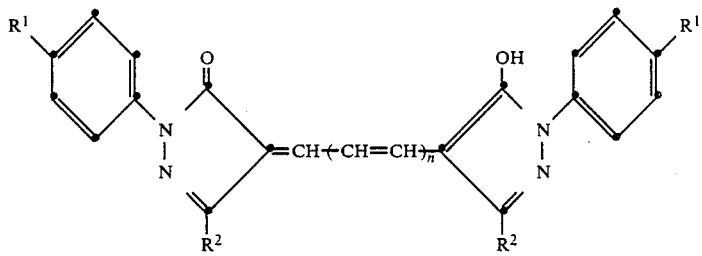

| Dye | R¹ | R² | n |
|---|---|---|---|
| 96 | Ph | CONHSO₂CH₃ | 1 |
| 97 | SO₂NHCOCH₃ | CH₃ | 1 |
| 98 | SO₂NHPh | CH₃ | 1 |
| 99 | CONHSO₂CH₃ | CH₃ | 1 |
| 100 | CONHSO₂PH | CH₃ | 1 |
| 101 | Ph | CONHSO₂CH₃ | 2 |
| 102 | SO₂NHCOCH₃ | CH₃ | 2 |
| 103 | SO₂NHPh | CH₃ | 2 |
| 104 | CONHSO₂CH₃ | CH₃ | 2 |
| 105 | CONHSO₂Ph | CH₃ | 2 |

TABLE XIV-continued

[Structure: bis-pyrazolone dye with R¹ substituents on phenyl rings, connected by =CH(CH=CH)ₙ chain, with R² groups]

| Dye | R¹ | R² | n |
|-----|-----|-----|---|
| 106 | [phthalimide-substituted phenyl group on each side, HN-C(=O)...C(=O) fused] | CH₃ | 1 |

TABLE XV

[Structure: bis-aryl polyene dye with NHSO₃R and NHSO₂R groups, CN substituents]

| Dye | R |
|-----|------|
| 107 | CH₃ |
| 108 | n-Pr |

TABLE XVI

[Structure: Me₂N-phenyl-(CH=CH)ₙ-CH= connected to pyrazolone with R¹ and R²]

| Dye | R¹ | R² | n |
|-----|------|------|---|
| 109 | CONHSO₂CH₃ | CH₃ | 0 |
| 110 | Ph | CONHSO₂CH₃ | 0 |
| 111 | CONHSO₂PH | CH₃ | 0 |
| 112 | Ph | CONHCOPh | 0 |
| 113 | SO₂NHCOCH₃ | CH₃ | 0 |
| 114 | CONHCOpNO₂Ph | CH₃ | 0 |
| 115 | CONHSO₂CH₃ | CH₃ | 1 |
| 116 | Ph | CONHSO₂CH₃ | 1 |
| 117 | CONHSO₂PH | CH₃ | 1 |
| 118 | Ph | CONHCOPh | 1 |
| 119 | SO₂NHCOCH₃ | CH₃ | 1 |
| 120 | CONHCOpNO₂Ph | CH₃ | 1 |

TABLE XVI-continued

[Structure: Me₂N-C₆H₄-(CH=CH)ₙ-CH=C(R²)(C(=O)-C₆H₄-R¹) with N=N linkage to R² side]

| Dye | R¹ | R² | n |
|---|---|---|---|

121: Me₂N–C₆H₄–CH=C(–C(=O)–C₆H₄(NHC(=O)–)(=N–N=))–CH₃

122: Me₂N–C₆H₄–CH=CH–CH=C(–C(=O)–C₆H₄(NHC(=O)–)(=N–N=))–CH₃

123: Me₂N–C₆H₄–CH=C(CN)–C(=O)–C₆H₄–C(=O)NHSO₂CH₃

124: Me₂N–C₆H₄–CH=CH–CH=C(CN)–C(=O)–C₆H₄–C(=O)NHSO₂CH₃

125: (julolidinyl)–CH=C(naphthoquinone)–NHSO₂CH₃

TABLE XVI-continued

Structure:
Me₂N—C₆H₄—(CH=CH)ₙ—CH= [pyrazolinone ring with N-N, C=O groups bearing R¹-phenyl substituent via N, and R²]

| Dye | R¹ | R² | n |
|---|---|---|---|

Dye 126: Me₂N—C₆H₄—CH=CH—CH= [fused bicyclic diketone system with NHSO₂CH₃ substituent]

---

The above structural formulas utilize a number of abbreviations (e.g., Ph for phenyl, Pr for propyl, Bu for butyl, Hex for hexyl, Me for methyl, Et for ethyl, and others that would be recognized by one skilled in the art.

The dyes of formula (I) can be prepared by synthetic techniques well-known in the art, as illustrated by the synthetic examples below. Such techniques are further illustrated, for example, in "*The Cyanine Dyes and Related Compounds*", Frances Hamer, Interscience Publishers, 1964.

The dye compounds of formula (I) are utilized in the form of a solid particle dispersion (i.e., the dye is in the form of solid particles of microscopic size). The dispersion can be in any vehicle in which the dye is not soluble, such as an aqueous liquid having a pH low enough for the dye to be insoluble (e.g., a gelatin coating solution), an organic solvent in which the dye is insoluble, a monomer, or a polymeric binder. The dispersion is useful for incorporation into a layer having a polymeric film-forming binder known in the art (e.g., a hydrophilic colloid binder) a photographic element. Incorporation of filter dyes as solid particle dispersions (as defined herein) has a number of advantages over prior known methods of incorporation (e.g., loaded polymer latexes, oil-in-water dispersions utilizing a high-boiling water-immiscible solvent, and precipitation techniques that result in formation of large particles (e.g., greater than about 10 μm). These prior art techniques can lead to a number of problems, such as optical defects, poor covering power of the filter dye, and dye stain.

The dyes may be located in any layer of the element where it is desirable to absorb light, but it is particularly advantageous to locate them in a layer where they will solubilized and washed out during processing. Useful amounts of dye range from 1 to 100 mg/m². The dye should be present in an amount sufficient to yield an optical density at the transmission D-max in the visible region before processing of at least 0.10 density units and preferably at least 0.30 density units. This optical density will generally be less than 5.0 density units for most photographic applications.

The solid particle dispersion can be formed by precipitating or by reprecipitating the dye in the form of a dispersion and/or well-known milling techniques, e.g., ball-milling or sand-milling, the solid dye in the presence of a dispersing agent. Reprecipitating techniques by dissolving the dye and precipitating by changing the solvent and/or the pH of the solution in the presence of a surfactant are well-known in the art. Milling techniques are well-known in the art and are described, for example in U.S. Pat. No. 4,006,025. The dye particles in the dispersion should have a mean diameter of less than 10 μm and preferably less than 1 μm. The dye particles can be conveniently prepared in sizes ranging down to about 0.01 μm or less.

The support of the element of the invention can be any of a number of well-known supports for photographic elements. These include polymeric films such as cellulose esters (e.g., cellulose triacetate and diacetate) and polyesters of dibasic aromatic carboxylic acids with divalent alcohols (e.g., poly(ethylene terephthalate)), paper, and polymer-coated paper. Such supports are described in further detail in *Research Disclosure*, Dec., 1978, Item 17643 [hereinafter referred to as *Research Disclosure*], Section XVII.

The radiation-sensitive layer of the element of the invention can contain any of the known radiation-sensitive materials, such as silver halide, diazo image-forming systems, light-sensitive tellurium-containing compounds, light-sensitive cobalt-containing compounds, and others described in, for example, J. Kosar, Light-Sensitive Systems: Chemistry and Application of Non-silver Halide Photographic Processes, J. Wiley & Sons, N.Y. (1965).

Silver halide is especially preferred as a radiation-sensitive material. Silver halide emulsions can contain, for example, silver bromide, silver chloride, silver iodide, silver chlorobromide, silver chloroidide, silver bromoiodide, or mixtures thereof. The emulsions can include coarse, medium, or fine silver halide grains bounded by 100, 111, or 110 crystal planes. Silver halide emulsions and their preparation are further described in *Research Disclosure*, Section I. Also useful are tabular grain silver halide emulsions, as described in *Research Disclosure*, Jan., 1983, Item 22534 and U.S. Pat. No. 4,425,426.

The radiation-sensitive materials described above can be sensitized to a particular wavelength range of radiation, such as the red, blue, or green portions of the visible spectrum, or to other wavelength ranges, such as ultraviolet, infrared, X-ray, and the like. Sensitization of silver halide can be accomplished with chemical sensitizers such as gold compounds, iridium compounds, or other group VIII metal compounds, or with spectral sensitizing dyes such as cyanine dyes, merocyanine dyes, styryls, or other known spectral sensitizers. Additional information on sensitization of silver halide is described in *Research Disclosure*, Sections I-IV.

The dyes of formula (I) are useful in many applications requiring the use of a filter dye. For example, they can be used as interlayer dyes, trimmer dyes, antihalation dyes, or pelloid dyes. They can be used to prevent crossover in X-ray materials, to prevent unwanted blue light from reaching the green-sensitive emulsion layer of a multicolor photographic element, and other uses as indicated by the absorbance spectrum of the particular dye. The dyes can be used in a separate filter layer or as an intergrain absorber.

Multicolor photographic elements according to the invention generally comprise a blue-sensitive silver halide layer having a yellow color-forming coupler associated therewith, a green-sensitive layer having a magenta color-forming coupler associated therewith, and a red-sensitive silve halide layer having a cyan color-forming coupler associated therewith. Color photographic elements and color-forming couplers are well-known in the art and are further described in *Research Disclosure*, Section VII.

The element of the invention can also include any of a number of other well-known additives and layers, as described in *Research Disclosure*. These include, for example, optical brighteners, antifoggants, image stabilizers, light-absorbing materials such as filter layers of intergrain absorbers, light-scattering materials, gelatin hardeners, coating aids and various surfactants, overcoat layers, interlayers and barrier layers, antistatic layers, plasticizers and lubricants, matting agents, development inhibitor-releasing couplers, bleach accelerator-releasing couplers, and other additives and layers known in the art.

The dye of formula (I) can be located in any layer of a photographic element where it is desired to absorb light. In a preferred embodiment, the dye is preferably located in a layer where it will be subjected to high pH (i.e., 8 to 12) and/or sulfite during photographic processing, so as to allow the dye to be solubilized and removed or decolorized.

The photographic elements of the invention, when exposed, can be processed to yield an image. During processing, the dye of formula (I) will generally be decolorized and/or removed. Following processing, the dye of the invention should contribute less and 0.10 density unit, and preferably less than 0.02 density unit to the transmission D-max in the visible region in the minimum density areas of the exposed and processed element.

Processing can be by any type of known photographic processing, as described in *Research Disclosure*, Sections XIX-XXIV, although it preferably includes a high pH (i.e., 8 or above) step utilizing an aqueous sulfite solution in order to maximize decolorization and removal of the dye. A negative image can be developed by color development with a chromogenic developing agent followed by bleaching and fixing. A positive image can be developed by first developing with a nonchromogenic developer, then uniformly fogging the element, and then developing with a chromogenic developer. If the material does not contain a color-forming coupler compound, dye images can be produced by incorporating a coupler in the developer solutions.

Bleaching and fixing can be performed with any of the materials know to be used for that purpose. Bleach baths generally comprise an aqueous solution of an oxidizing agent such as water soluble salts and complexes of iron (III) (e.g., potassium ferricyanide, ferric chloride, ammonium of potassium salts of ferric ethylenediaminetetraacetic acid), water-soluble persulfates (e.g., potassium, sodium, or ammonium persulfate), water-soluble dichromates (e.g., potassium, sodium, and lithium dichromate), and the like. Fixing baths generally comprise an aqueous solution of compounds that form soluble salts with silver ions, such as sodium thiosulfate, ammonium thiosulfate, potassium thiocyanate, sodium thiocyanate, thiourea, and the like.

The invention is further illustrated by the following Examples:

SYNTHESIS EXAMPLE 1—DYE 6

Step 1—Preparation of Intermediate A

To a solution of 29.6 g of 5-amino-2-methylbenzoxazole in 100 ml pyridine cooled to 0° C. was added 41.3 g hexanesulfonyl chloride. After 1 hour stirring at 0° C., a reddish precipitate formed. The reaction mixture was stirred at room temperature for 2 days and then poured into 1.4 l of water and stirred for 2 hours. A heavy oil deposited and the supernatant was decanted. The oil was dissolved in 1.0 l dichloromethane, which was extracted with 4×200 ml of 1N hydrochloric acid, then dried over magnesium sulfate. The solvent was removed, leaving a reddish brown liquid of 5-hexylsulfonamido-2-methylbenzoaxazole (Intermediate A).

Step 2—Preparation of Intermediate B

A mixture of 60 g of Intermediate A and 44 g ethyl p-toluenesulfonate was heated in a round bottom flask at 150° C. for 5 minutes. Upon cooling to room temperature, the crude brown mass was almost solidified. The product was dissolved in 25 ml methanol and poured into 300 ml diethyl ether with rapid stirring for 1 hour. The solid precipitate was chilled at 2° C. overnight, and then filtered. The tan powder was thoroughly washed with ether and recrystallized from 200 ml hot isopropyl alcohol to yield 23.4 g of 3-ethyl-5-hexylsulfonamido-2-methylbenzoaxazolium p-toluenesulfonate (Intermediate B).

Step 3—Preparation of Intermediate C

A combination of 10 g Intermediate B and 8 g N,N-diphenylformamidine was thoroughly mixed and heated with stirring at 150°-160° C. for 25 minutes. The flask was then fitted with a condenser and 50 ml hot acetone was cautiously added. An orange precipitate formed. The flask was removed from the heat, cooled, and chilled in ice. After 1 hour, the reddish precipitate was filtered off and discarded. The filtrate was poured into 300 ml diethyl ether and stirred for 2 hours. The resulting yellow-orange powder was filtered, washed with ether, and dried to yield 10.6 g of 2-(2-anilinovinyl)-3-ethyl-5-hexylsulfonamidobenzoxazolium p-toluenesulfonate (Intermediate C).

Step 4—Preparation of Dye 6

A mixture of 2.7 g of Intermediate C, 15 ml ethanol, 0.54 g acetic anhydride, and 0.7 ml triethylamine was heated at reflux for 1 minute. Then 1.2 g 4-methylsulfonamidobenzoylacetonitrile (prepared according the procedure disclosed in Kreuger et al U.S. Pat. No. 4,420,555) and 0.8 ml triethylamine were added and the mixture was heated at reflux for 2 minutes. The mixture was then chilled in ice for 30 minutes. The yellow-orange precipitate that had formed was filtered, washed with isopropyl alcohol and diethyl ether, then air dried to yield 1.17 g of crude dye. The reaction was repeated twice more to obtain a total of 3.0 g of crude dye, which was dissolved in 250 ml hot acetone, which was stirred with 10 g Amberlyst-15 ® ion exchange resin for 3 hours, heated for 15 minutes to reflux, then filtered while hot. The filtrate was chilled to 2° C. overnight and the resulting yellow precipitate was air dried to yield 2.3 g of Dye 6. The dye had a melting point of 297°–298° C., λ-max=442 nm (methanol, $\epsilon = 7.32 \times 10^4$. The pKa's of this dye was measured by acid titration of a 50/50 (volume basis) mixture of ethanol and water and was determined to be 8.1 for the methylsulfonamido substituent and 9.2 for the hexylsulfonamido substituent. The log P was determined to be 4.66.

SYNTHESIS EXAMPLE 2—PREPARATION OF DYE 7

Step 1—Intermediate D

To a solution of 5-amino-2-methylbenzoxazole (14.8 g) in 50 ml pyridine cooled to 0° C. was added methane sulfonylchloride (12.5 g). The mixture was stirred at room temperature under nitrogen. After three days of stirring, a tan precipitate had formed. The mixture was then poured into 800 ml ligroin P950 and stirred for 2 hours. The solid in the mixture was dissolved in 400 ml $CH_2Cl_2$, washed with $4 \times 100$ ml $H_2O$ with the water back extracted with 100 ml $CH_2Cl_2$, combined with the organic layers, dried over $MgSO_4$, filtered, and concentrated in vacuo to a tan brown solid. The solid was dissolved in 125 ml hot methanol, added to 25 ml isopropyl alcohol, chilled at 2° overnight filtered, washed with diethyl ether, and air dried to yield 15.2 g 2-methyl-5-methylsulfonamidobenzoxazolium iodide (intermediate D).

Step 2—Intermediate E

Intermediate D (4.52 g) and ethyl p-toluenesulfonate (4.4 g) were combined in a large test tube and heated over a hot air gun with manual stirring for 5 minutes. A brownish melt formed, which solidified to a glass on cooling to room temperature. The glas was dissolved in 50 ml hot methanol, diluted with an 100 ml hot ethanol, and 9.0 g tetrabutylamonnium iodide dissolved in 20 ml ethanol was added. The brown, clear solution was cooled to room temperature and then ice cooled for 4 hours. Filtration of the resulting crystalline product gave 5.92 g of 3-ethyl-2-methyl-5-methylsulfonamidobenzoxazolium iodide (Intermediate E).

Step 3—Intermediate F

Intermediate E (1.0 g) and diphenylformamidine (2.2 g) were combined in a flask and heated over a hot air gun with manual stirring until a yellow-orange color formed. The reaction was then heated for 1 minute at full heat until it became totally liquid. On cooling to room temperature, the reaction mixture solidified. This solid was dissolved in 20 ml hot acetone, poured into 100 ml diethyl ether with stirring, and stirred for 1 hour. The solid was then filtered out and washed with diethyl ether to give 1.2 g of 2-(2-anilinovinyl)-3-ethyl-5-methylsulfonamidobenzoxazolium iodide (Intermediate F).

Step 4—Dye 7

Intermediate F (3.8 g) and 20 ml ethanol were combined with stirring, then acetic anhydride (1.08 g) and triethylamine (2.2 g) were added. The mixture was heated with a hot air gun for 30 seconds and then pulverized. 1.5 ml of triethylamine was added and the mixture was heated for 2 minutes, stirred without heating for 5 minutes, cooled to room temperature, diluted with 20 ml isopropyl alcohol, and filtered. The solid was washed with 50 ml isopropyl alcohol, 50 ml diethyl ether, and air dried to yield 3.0 g of orange-brown powder. The solid was recrystallized by dissolving in 75 ml hot chclohexanone, diluting with 200 ml isopropyl alcohol, stored overnight at 2° C., and the solid filtered out, washed with diethyl ether and air dried to yield 2.4 g of Dye 7. The λ-max (methanol) was 446 nm, $\epsilon$-max=$7.84 \times 10^4$. The pKa's were measured by acid titration in a 50/50 (volume basis) mixture of ethanol and water and determined to be 8.2 for the propylsulfonamido substituent and 9.2 for the methylsulfonamido substituent. The log P was determined to be 3.07.

SYNTHESIS EXAMPLE 3—DYE 23

Step 1—Preparation of Intermediate-1-(3,5-Dicarboxyphenyl-3-ethyl)-2-pyrazolin-5-one A solution of sodium nitrite (35.8 g, 0.52 mol) in water (75 ml) was added to a slurry of 5-aminoisophthalic acid (90.6 g, 0.50 mol) in 4.8 molar HCl (500 ml) at 0° C. over 15 minutes with stirring. Stirring was continued for one hour at 0°–5° C. and the slurry was then added to a solution of sodium sulfite (270 g, 2.2 mol) in water (1.21) all at one time, with stirring, at 2° C. The resulting homogenous solution was heated at 50°–60° C. for 45 minutes. Concentrated HCl (60 ml) ws added and the reaction mixture was heated further at 90° C. for one hour. After cooling to room temperature, another portion of concentrated HCl (500 ml) was added. The solid was isolated by filtration and washed on a funnel with acidified water, EtOH and ligroin in succession. The off-white solid was dissolved in a solution of NaOH (76 g, 1.85 mol in 600 ml water). This solution was subsequently acidified with glacial acetic acid (166 ml, 3.0 mol) to yield a thick slurry. This was isolated by filtration, washed on the funnel with water, EtOH, and ligroin in succession, and thoroughly dried in a vacuum oven at 80° C., and 10 mm Hg. The mp was above 300° C. The NMR and IR spectra were consistent with the structure for 5-hydrazino-1,3-benzenedicarboxylic acid. The product gave a positive test for hydrazine with Tollens' reagent.

A slurry composed of the product 5-hydrazino-1,3-benzenedicarboxylic acid (64.7 g, 0.33 mol), ethylacetoacetate (50.7 g, 0.39 mol) and glacial acetic acid (250 ml) was stirred and refluxed for 22 hours. The mixture was cooled to room temperature and the product that had precipitated was isolated by filtration, washed with water, EtOH, $Et_2O$, and ligroin in succession and thoroughly dried in a vacuum oven at 80° C. and 10 mm Hg. The mp of the solid was above 310° C. The NMR and IR spectra were consistent with the assigned structure. The product gave a negative test with Tollens' reagent. The C,H, and N elemental analyses were in agreement with those calculated for the empirical formula.

Step 2—Dye 23

To a solution of 3-ethyl-5-ethylsulfonamido-2-methylbenzoxazolium p-toluenesulfonate (88.1 g) in 200 ml of methanol at reflux temperature was added Intermediate G (50.0 g) and triethylamine (50 ml). The reaction was refluxed for 1 hour. The crude product mixture was then chilled in ice/water and the precipitated product was collected by filtration and washed with isopropyl alcohol and diethyl ether to give a crude product weight of 20.25 grams. The dye was purified by slurring in 400 ml of refluxing glacial acetic acid to afford 15.6 grams of pure Dye 23. NMR spectrum was consistent with the structure, λ-max 453 nm (methanol), ε-max $7.50 \times 10^4$.

SYNTHESIS EXAMPLE 4—DYE 32

A mixture of dimethylaminobenzaldehyde (2.98 g), p-methylsulfonamidobenzoylacetonitrile (4.76 g), and ethanol (40 ml) was refluxed for 3 hours. Then, 5 drops of triethylamine was added and reflux was continued for an additional 4 hours. The reaction was cooled to room temperature and allowed to stand at 2° C. for 18 hours. The precipitated product was collected by filtration and washed with isopropyl alcohol to give a crude product weight of 6.62 grams. The dye was purified by recrystallization from 120 ml of refluxing glacial acetic acid to afford 5.8 g of Dye 32, m.p.=208°–211° C. NMR was consistent with the structure, λ-max 443 nm (methanol), ε-max=$4.59 \times 10^4$.

SYNTHESIS EXAMPLE 5—DYE 36

A mixture of 9-formyljulolidene (4.22 g), p-methylsulfonamidobenzoylacetonitrile (5.0 g) and glacial acetic acid (30 ml) was refluxed for 4 hours. The product mixture was cooled to room temperature and the precipitated product was collected by filtration to afford a crude product weight of 5.76 g. The dye was purified by successive slurring in 150 ml of refluxing ethanol, then 100 ml of refluxing glacial acetic acid, then 150 ml of refluxing methanol to afford 2.65 grams of pure Dye 36, m.p.=224°–225° C. The NMR spectrum was consistent with the dye structure, λ-max 474 nm (methanol), ε-max $519 \times 10^4$.

SYNTHESIS EXAMPLE 6—DYE 42

A mixture of p-propylsulfonamidobenzoylacetonitrile (7.0 g), glutacondialdehyde dianil hydrochloride (3.74 g), triethylamine (11.2 ml), and dimethylformamide (50 ml) was heated to 130° C. with constant stirring for 30 minutes. The crude product mixture was cooled to room temperature then poured into 100 ml water. To the crude aqueous product mixture was added 10 ml concentrated hydrochloric acid with rapid stirring. A dark blue gum separated from the soltuion. The mother liquors were decanted and the gum was treated with 100 ml of glacial acetic acid and slowly stirred for 30 minutes. The resulting solid product was collected by filtration and washed with ligroin to give a crude product weight of 1.97 g. The dye was purified by slurrying in 150 ml of water at room temperature for 1 hour. The product was collected by filtration and dried in a vacuum oven for 3 hours to afford 1.85 g of pure Dye 42, m.p.=182°–184° C. The NMR was consistent with the dye structure, λ-max 604 nm (methanol), ε-max $10.5 \times 10^4$.

SYNTHESIS EXAMPLE 7—DYE 38

A mixture of p-propylsulfonamidobenzoylacetonitrile (5.0 g), dimethylaminocinnamaldehyde (3.29 g) and 30 ml of 60% glacial acetic acid in water was reluxed for 3 hours. The crude product mixture was chilled in ice/water and the precipitated crude product was collected by filtration and washed with diethylether. The crude product was slurried in 200 ml of ethanol at reflux for 1 hour then the slurry was chilled in ice and the product collected by filtration and air dried overnight. The weight of pure Dye 38 was 6.51 g, m.p.=184°–186° C. The NMR spectrum was consistent with the structure, λ-max 490 nm (methanol), ε-max=$4.93 \times 10^4$.

SYNTHESIS EXAMPLE 8—DYE 67

A mixture of 1-(4-methylsulfonamidophenyl)-3-methyl-2-pyrazolin-5-one (7.0 g), trimethoxypropene (2.8 g), triethylamine (7.0 ml), and methanol (25 ml) was stirred at room temperature for 15 minutes then heated to reflux for 4 hours. The crude product mixture was poured into a 0.1N oxalic acid solution (700 ml). The precipitated crude dye was collected by filtration and washed with water to give a crude weight of 8.56 g. The dye was purified by slurring in 150 ml of glacial acetic acid at reflux and the undissolved pure dye was collected from the hot slurry by filtration. The collected solid was washed with diethyl ether to afford 2.76 g pure Dye 67, m.p.=252°–254° C. The NMR spectrum was consistent with the product structure, λ-max 522 nm (methanol), ε-max=$8.97 \times 10^4$.

EXAMPLES 15–23—DYE WANDERING AND SOLUBILIZATION

Dyes according to formula (I) were prepared as solid particle dispersions by ball-milling according to the following procedure. Water (21.7 ml) and a 6.7% solution of Triton X-200 ® surfactant (2.65 g) were placed in a 60 ml screw-capped bottle. A 1.00 g sample of dye was added to this solution. Zirconium oxide beads (40 ml, 2 mm diameter) were added and the container with the cap tightly secured was placed in a mill and the contents milled for four days. The container was removed and the contents added to a 12.5% aqueous gelatin (8.0 g) solution. The new mixture was placed on a roller mill for 10 minutes to reduce foaming and the resulting mixture was filtered to remove the zirconium oxide beads.

These solid particle dispersions were coated on polyester supports according to the following procedure. A spreading agent (surfactant 10G ®) and a hardener (bis(vinylsulfonylmethyl) ether) were added to the dye-gelatin melt prepared as described above. A melt from this mixture was then coated on a poly(ethylene terephthalate) support to achieve a dye coverage of 0.32 g/m², a gelatin coverage of 1.60 g/m², a spreading agent level of 0.096 g/m², and a hardener level of 0.016 g/m². The absorbance of the dye dispersions was measured with a spectrophotometer. Identical elements were subjected to a 5 minute distilled water wash, to Kodak E-6 ® Processing (which is described in *British Journal of Photography Annual,* 1977, pp. 194–97), and to Kodak Prostar ® processing (which is used commercially to process microfilm, subjecting the elements to a development step at a pH of about 11.4 for about 30 seconds), and the absorbance was measured for each. The results are presented in Table XVII.

For comparison, dyes outside the scope of formula (I), having the structures:

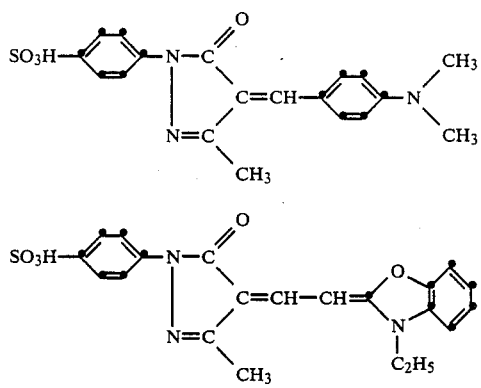

were coated at identical levels.

TABLE XVII

| Dye | λ-max (nm) | Bandwidth (nm) | D-max | D-max after water Wash | D-max After E-6 ® Processing | D-max After Prostar ® Processing |
|---|---|---|---|---|---|---|
| 1 | 431 | 75 | 1.52 | 1.57 | 0.01 | 0.01 |
| 2 | 425 | 99 | 1.72 | 1.72 | 0.01 | — |
| 3 | 481 | 88 | 1.53 | 1.57 | 0.02 | — |
| 4 | 446 | 107 | 1.42 | 1.41 | 0.01 | None |
| 23 | 446 | 93 | 1.16 | 1.21 | .01 | .01 |
| 21 | 449 | 83 | 1.43 | 1.50 | .01 | .01 |
| 18 | 449 | 84 | 1.39 | 1.39 | .01 | .01 |
| 7 | 495 | 91 | 0.83 | 0.84 | .01 | .01 |
| 12 | 448 | 101 | 1.14 | 1.16 | .01 | .01 |
| 20 | 455 | 98 | 1.28 | 1.28 | .01 | .01 |
| 22 | 472 | 107 | 1.26 | 1.23 | .01 | .01 |
| 19 | 481 | 100 | 1.18 | 1.13 | .01 | .01 |
| 24 | 496 | 104 | 0.92 | 0.97 | .01 | .01 |
| 14 | 451 | 101 | .98 | 1.00 | .01 | .01 |
| 32 | 518 | 116 | 1.01 | .99 | .01 | .01 |
| 33 | 456 | 87 | 1.58 | 1.61 | 0.01 | .01 |
| 34 | 501 | 107 | 1.12 | 1.16 | .01 | .01 |
| 30 | 430 | 87 | 0.97 | 0.97 | 0.01 | 0.01 |
| 36 | 462 | 68 | 0.89 | 0.89 | 0.01 | — |
| 37 | 469 | 102 | 1.09 | 1.10 | .01 | .01 |
| 38 | 423 | 9 | 1.34 | 1.40 | .01 | .01 |
| 42 | 607 | 103 | 0.904 | 0.409 | .01 | .01 |
| 45 | 459 | 102 | 1.52 | 1.50 | 0.01 | 0.01 |
| 44 | 449 | 121 | 1.04 | 1.06 | 0.02 | — |
| 47 | 425 | 97 | 1.37 | 1.39 | 0.10 | — |
| 67 | 519 | 163 | 0.65 | 0.20 | 0.01 | .01 |
| C-1 | 450 | 117 | 1.43 | 0.01 | — | 0.01 |
| C-2 | 425 | 81 | 2.28 | 0.01 | — | — |

The results presented in Table XVII show that the dyes according to the invention are not affected by the water wash, indicating no wandering at coating pH, but are fully solubilized for removal and/or decolorization by the photographic processing to which they were subjected.

The invention has been described in detail with reference to preferred embodiments thereof. It should be understood, however, that variations and modifications can be made within the spirit and scope of the invention.

We claim:

1. A photographic element comprising a support having thereon a radiation-sensitive silver halide emulsion layer and a hydrophilic filter dye layer comprising a hydrophilic binder and an amount effective as a photographic filter dye of a dispersion of solid particles having a mean diameter of from about 0.01 to 10 mm, said particles consisting essentially of a filter dye having the formula:

$[D-(A)_y]-X_n$ where

D is a chromophoric light-absorbing moiety, which, when y is 0, comprises an aromatic ring free of carboxy substituents, A is an aromatic ring, free of carboxy substituents, bonded directly or indirectly to D, X is a substituent, other than carboxy, having an ionizable proton, either on A or on an aromatic ring portion of D, having a pKa of about 4 to 11 in a 50/50 mixture (volume basis) of ethanol and water, y is 0 to 4, n is 1 to 7, and the compound has a log partition coefficient of from about 0 to 6 when the compound is in unionized form.

2. A photographic element according to claim 1 wherein X and the aromatic ring to which it is attached are selected from the group consisting of sulfonamidophenyl,

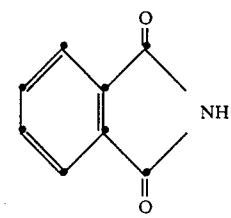

-continued

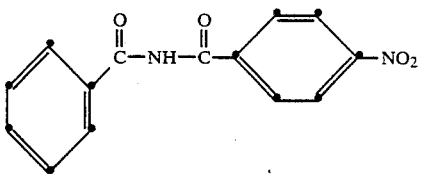

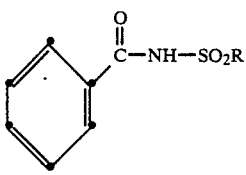

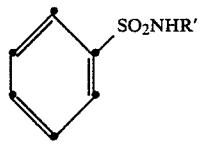

and

-continued

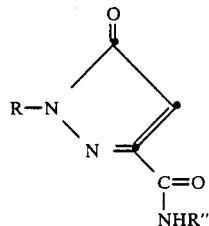

where R' is acyl, phenyl, or vinyl, R" is —CO—PH or SO$_2$R, R is alkyl or aryl, and Ph is phenyl.

3. A photographic element according to claim 1 wherein the particles in said dispersion have a mean diameter of from about 0.01 to 1 μm.

4. A photographic element according to claim 1 wherein said hydrophilic binder is a hydrophilic colloid.

5. A photographic element according to claim 1 wherein said hydrophilic binder is gelatin.

6. A photographic element according to claim 1 wherein said filter dye layer is the same as the silver halide layer.

7. A photographic element according to claim 1 wherein said filter dye layer is different than said silver halide layer.

8. A photographic element according to claim 7 wherein said filter dye layer is on the same side of the support as said silver halide layer.

9. A photographic element according to any of claims 1-8 wherein X has a pKa of from about 7 to 11.

10. A photographic element according to any of claims 1-8 wherein X is sulfonamido.

* * * * *